Jan. 12, 1932.  G. E. TUBBS  1,840,990

CAM LOCATING AND STAKING MACHINE

Filed April 14, 1930  3 Sheets-Sheet 1

Inventor
George E. Tubbs
By Liverance and
Van Anturip
Attorneys

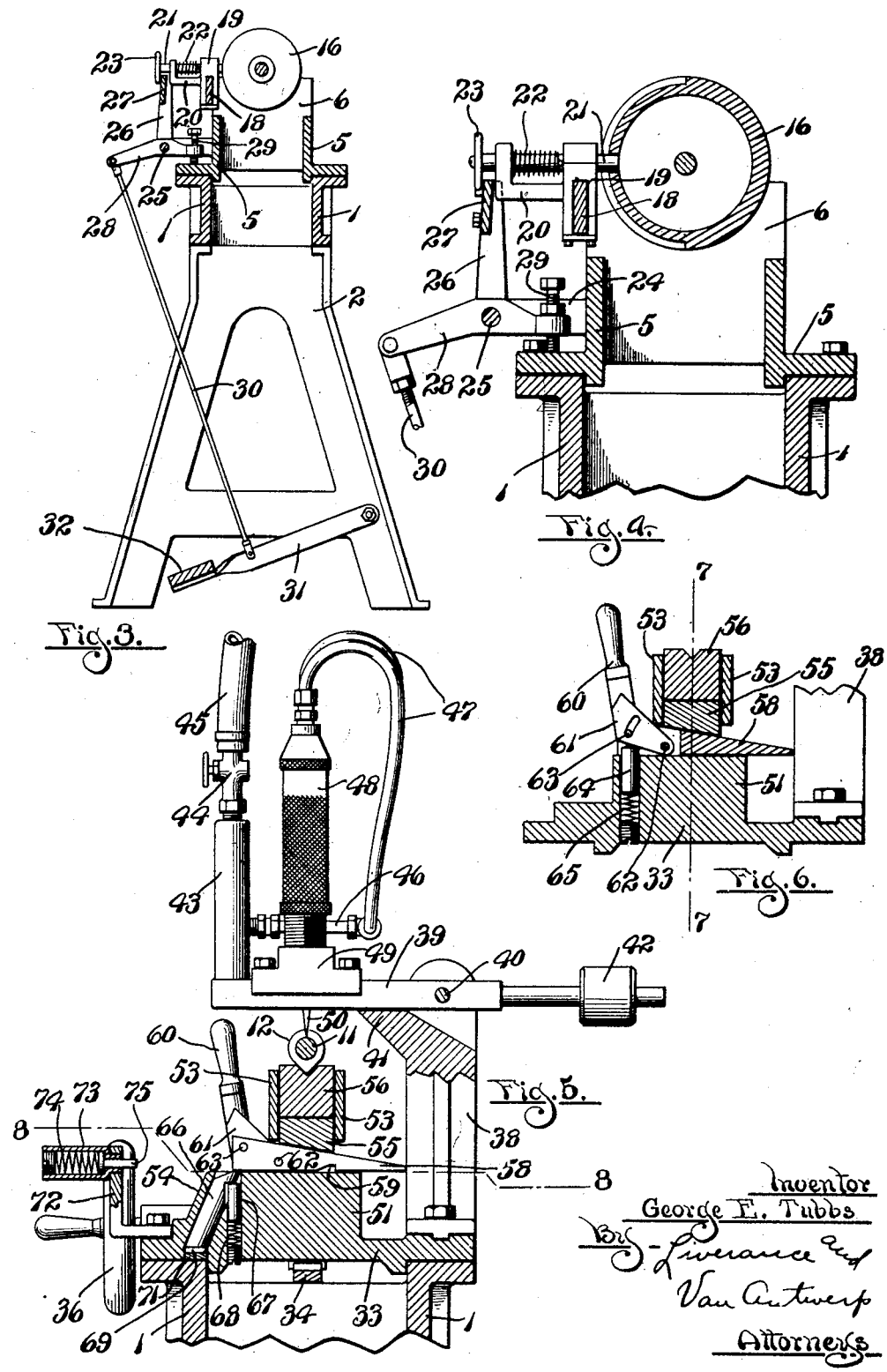

Jan. 12, 1932.  G. E. TUBBS  1,840,990
CAM LOCATING AND STAKING MACHINE
Filed April 14, 1930   3 Sheets-Sheet 3

Inventor
George E. Tubbs
By Liverance and
Van Antwerp
Attorneys

Patented Jan. 12, 1932

1,840,990

UNITED STATES PATENT OFFICE

GEORGE E. TUBBS, OF HILLSDALE, MICHIGAN

CAM LOCATING AND STAKING MACHINE

Application filed April 14, 1930. Serial No. 443,942.

This invention relates to a cam locating and staking machine. It is directed to a machine for locating and staking or temporarily securing cams on a shaft which, in a further step, are to be welded and in this manner permanently and inseparably secured to the shaft in accordance with the disclosure of Patent No. 1,390,949 to Yassenoff issued September 13, 1921.

Prior to welding the cams on the shaft it is necessary that they be located at proper spaced apart points in the length of the shaft and in proper angular relation to each other and fixed to the shaft in a sufficiently secure manner that they will not break loose and change position prior to or during the succeeding welding operation. The present invention is directed to a practical and efficient machine for attaining these desired results whereby the cams may be properly located both as to spacing apart and as to angular position on a plain cylindrical shaft and staked thereto, that is, secured in the proper positions in which they have been located. Understanding of the invention may be had from the following description, taken in connection with the accompanying drawings, in which, Fig. 1 is a front elevation of the machine of my invention.

Fig. 3 is a transverse section substantially on the plane of line 3—3 of Fig. 1.

Fig. 4 is a fragmentary enlarged transverse section substantially on the same plane as Fig. 3.

Fig. 5 is a fragmentary enlarged transverse vertical section substantially on the plane of line 5—5 of Fig. 1.

Fig. 6 is a fragmentary section showing a part of the elements disclosed in Fig. 5 in further detail.

Like reference characters refer to like parts in the different figures of the drawings.

Figure 1:
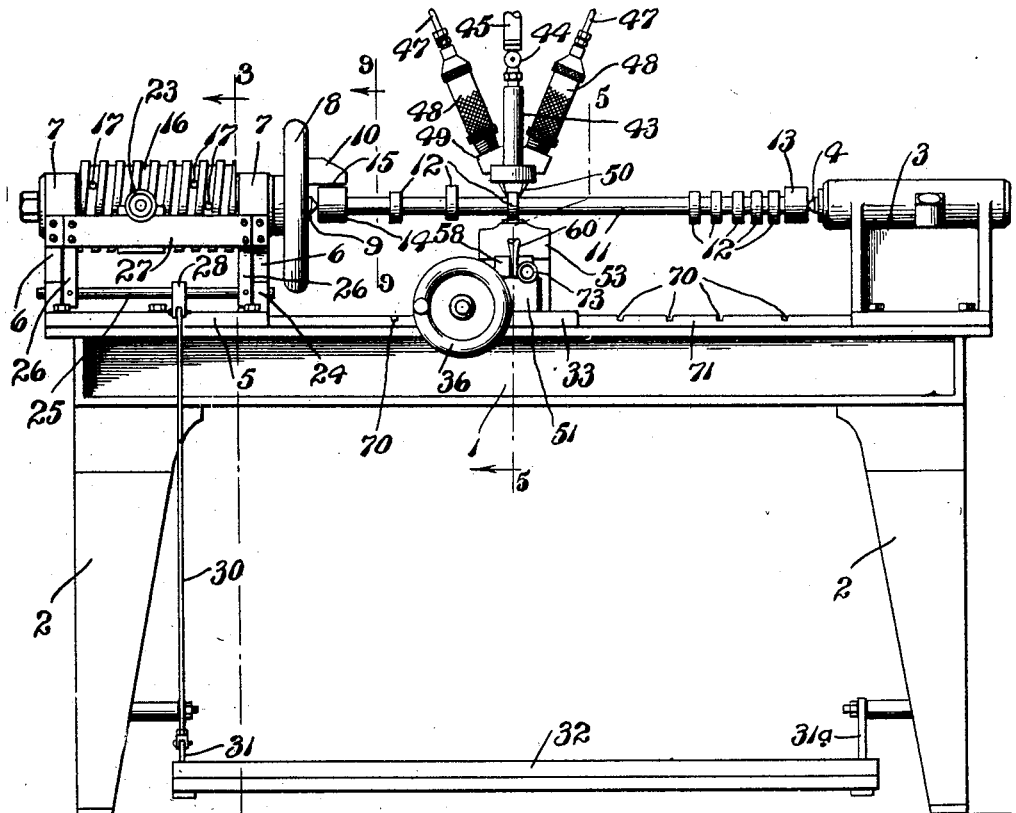
Figure 2:
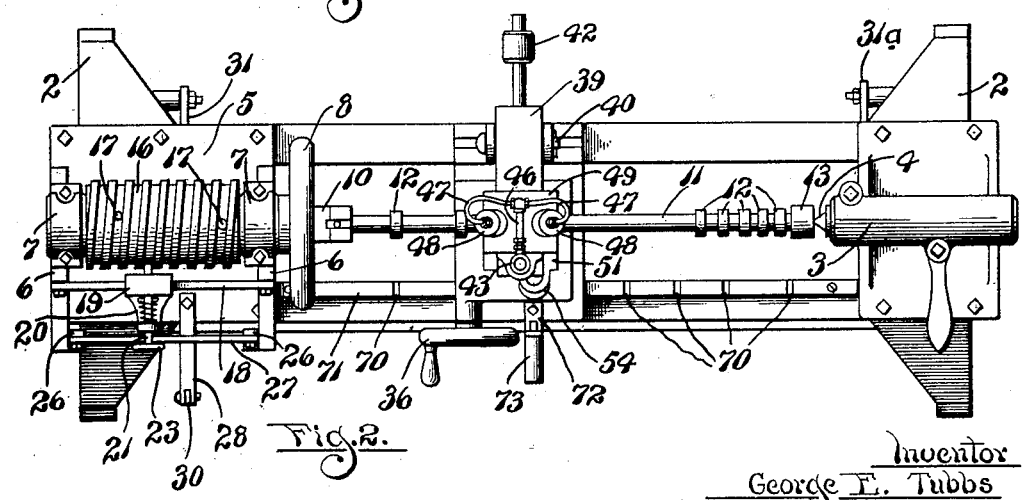
Fig. 2 is a plan view thereof.

In the construction shown a machine having some similarities to a lathe is used, having the usual bed construction including spaced apart sides 1 supported at the ends by legs or end supports 2 and with a tail stock 3 equipped with a tail stock spindle and center 4 in the usual manner. The head stock is of a special form of construction. It includes a base or body 5 with spaced apart vertical ends 6 carrying spaced bearings 7 for the head stock shaft which is equipped with a hand wheel 8 at its inner end and a head stock center 9. The hand wheel 8 in the present construction is of a special form having a slotted lug 10 extending horizontally therefrom, the use of which will be later described.

Between the head and tail stock centers the shaft 11, on which the cams are to be placed, is located. The cams 12 are placed loosely over the shaft, end bearings 13 and 14 are secured to the shaft in any suitable manner and in some instances, where intermediate bearings are to be attached to the shaft 11, they may be slid over the shaft in proper position between certain of the cams and thereafter welded to the shaft at the same time the cams are welded after the cams have been staked in position. The end bearing 14 adjacent the head stock center 9 has a pin 15 projecting therefrom which is received in the slot of the lug 10 whereby on turning the hand wheel 8 the shaft 11 turns with it.

On the head stock shaft between the bearings 7 a drum 16 is mounted which is cut from one end to the other with a helical square threaded screw; and at certain predetermined positions in the bottom of the screw thread thus made openings 17 are formed in the drum.

At the front of and below the axis of the drum 16 a horizontal guide bar 18 is located and permanently secured at its ends to the vertical ends 6 of the head stock. A block 19 is slidably mounted on the bar 18. It is provided with a forwardly extending bracket 20 having an upturned end through which and the upper portion of the block 19 a rod 21 is slidably guided. This rod is acted upon by a compression spring 22 to normally force the same forward so that its front end, riding in the helical screw on the drum 16, immediately enters any opening 17 when it comes thereto. The outer or front end of the rod 21 is equipped with a small disc or wheel 23.

Two spaced apart arms 24 extend forward from the end portions 6 of the head stock between which is a horizontal shaft 25 rotatably mounted at its ends in the arms 24. Two vertical arms 26 are pinned to the shaft, one adjacent each end thereof, and between their upper ends a flat plate 27 extends, the upper edge portion of which passes between the disc or wheel 23 and the adjacent bracket 20 (see Fig. 4). A lever 28 is secured to the shaft 25 between its ends and its rear end is provided with a vertical adjusting screw 29, as shown in Fig. 4. The front end has a downwardly extending rod 30 connected thereto which, at its lower end, is pivotally secured to a lever 31 (Fig. 3) which with a similar lever 31a are pivotally mounted at their rear ends on the end supports 2 of the machine. Their front ends are connected by a foot board 32 whereby the operator of the machine standing at substantially any place at the front, on stepping on the foot board pulls downwardly on the rod 30, rocking shaft 25 and thereby withdrawing the rod 21 from any opening in the drum 17 in which it may be seated; whereupon the operator, by manually operating the hand wheel 8, can turn the drum to a different position and the rod 21, having been released its inner or rear end will ride in the helical groove on the drum until the next adjacent opening 17 is reached.

A carriage 33 is slidably mounted on the bed and is movable lengthwise thereof, a horizontal rack 34 being located lengthwise of the bed below the carriage, with which a pinion 35 meshes, manually operable by a front hand wheel 36, both the pinion and wheel being mounted on a shaft 37 carried by the carriage. At the rear side of the carriage a vertical post 38 is secured. A bar 39 is pivotally mounted at 40 (Fig. 5) between its ends and normally rests on a stop 41 integral with the post. A weight 42 at the rear end of the bar 39 counter balances a pneumatic hammer construction mounted at the front portion of said bar.

At the front end of the bar 39 a vertical cylinder 43 receives compressed air through a valve 44 to which a hose 45 for carrying the air is connected, the passage of air from the hose being controlled by the valve. An outlet pipe 46 from the cylinder 43 connects with two pipes of hose 47 through which the air is led to the cylinders 48 of two pneumatic hammer constructions located at an angle to the vertical and carried on a base 49 in turn bolted on the bar 39. The pointed projecting ends 50 of the hammer plungers extend downwardly toward each other so as to come one on either side of a cam 12 on the shaft 11 and indent metal of the cam and shaft where the cam contacts with the shaft and thus stake or secure the cam in position on the shaft. The specific structure of a pneumatic hammer is well known and specifically is not novel in the present invention, except possibly in the pointed staking members 50.

The carriage 33 is formed with an integral upwardly extending block 51 the upper side of which is recessed making two spaced apart sides 52; and plates 53 extend between the upper portions of said sides 52 and are secured thereto. The front side of the block 51 has a downwardly and forwardly inclined projection 54 through which a downwardly and forwardly inclined opening is made for a purpose hereafter described.

Figure 7:
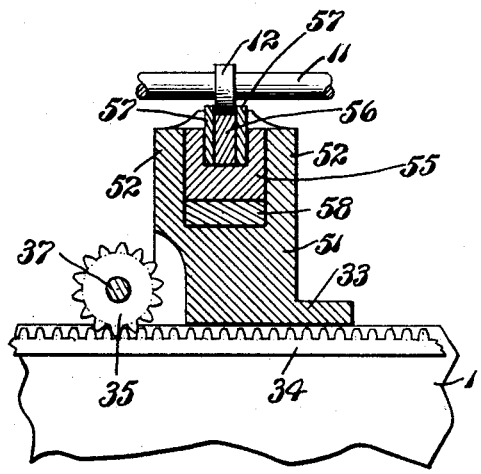
Fig. 7 is a fragmentary longitudinal section through the machine on the plane of line 7—7 of Fig. 6.
Figure 9:
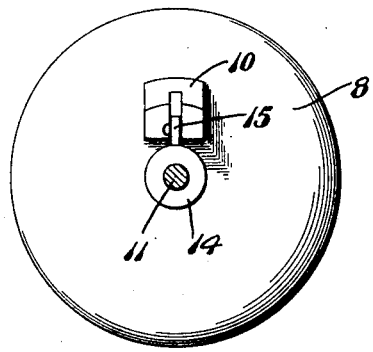
Fig. 9 is a view taken along the plane of the line 9—9 of Fig. 1.

The sides 52 on the block 51, together with the plates 53 form vertical guides for a block 55 which has an inclined under surface. The block 55 is divided or recessed at its upper side for the reception of a die 56 having a triangular shaped notch or recess in its upper side, while at each side thereof is a securing plate 57 (see Fig. 7). The notch in the block 56 is shaped to receive the projecting or pointed portion of a cam 12 to thereby hold it against rotative movement on the shaft 11 as shown in Fig. 5.

A slide bar 58 rides over the upper side of the block 51 between the sides 52 and underneath the block 55 whereby moving the slide 58 lengthwise will raise or lower block 55 and block 56. In the underside of the slide bar 58 a notch 59 is made, the forward part of which is inclined as best shown in Fig. 5.

A handle 60 is flattened at one end, as indicated at 61, to pass into a slot in the forward end of the slide bar 58, and is pivotally connected thereto at 62. It has an arc shaped slot a distance from the pivot through which a pin 63 passes. A vertical hole made through the block 51 carries a plunger 64 normally elevated by a coiled compression spring 65 (see Fig. 6), whereby with the parts in the position shown in Fig. 6 the pressure of the plunger 64 acts to hold the slide bar 58 at its rearmost position. By grasping the handle 60 and turning the same downwardly the plunger 64 is forced down whereupon both the handle and the bar 58 may be drawn forward. A locking rod or dog 66 is freely mounted in the inclined opening in the projection 54. A plunger 67 acted upon by a coil spring 58 (Fig. 5) engages in a notch in the dog 66 tending to move the dog upwardly so that its upper end will seat in the notch or recess 59 when bar 58 has been drawn to a forward position. The lower end of the dog 66 is formed with a tooth 69 adapted to seat in any one of the spaced recesses 70 in an elongated bar 71, said bar lying directly over the front side 1 of the bed and underneath the carriage which is movable over it; whereby with the parts in the position shown in Fig. 5, the carriage is locked against movement, but upon grasping the handle 60, turning it in a downward direction a short distance and then pulling the same forward, the dog 66 is elevated when its upper end enters the notch 59, thereby disconnecting the tooth 69 from the recess 70 in the bar 71 in which it has been located, permitting manual operation of hand wheel 36 to move the carriage 33 and attached parts to a different position.

Figure 8:
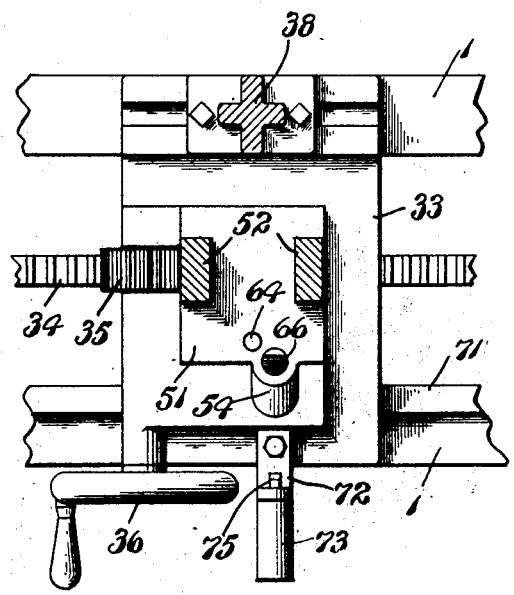
Fig. 8 is a fragmentary horizontal section and plan through the construction shown in Fig. 5 substantially on the plane of line 8—8 of Fig. 5.
Figure 10:
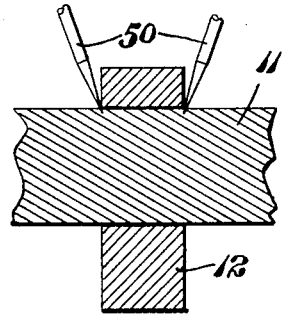
Fig. 10 is a fragmentary vertical transverse section of the cam shaft with a cam thereon and the manner in which the cam is staked on the shaft.

A bracket 72 (Figs. 5 and 8) is bolted on the carriage at the front side thereof. It has an upturned or vertical front portion to the upper end of which a cylindrical housing 73 is permanently secured. A coiled compression spring 74 in the housing acts upon a headed pin 75 which passes through the bracket and normally extends back thereof directly in alignment with the flattened portion 61 of the handle 60.

With a plurality of the cams 12 loose on the shaft 11, the carriage is moved and locked in the first position by engagement of the dog 66 with the first notch in bar 71, the cam 12 having previously been located with its point seated in the notch of the block 56, this being done by withdrawing the slide bar 58 to permit a lowering of the block 56, turning the cam so that its point is downward and directly over the notch, and then moving the slide bar 58 back to the position shown in Figs. 5 and 6. The drum 16 is turned by operating wheel 8 so that the rod 21 seats in the first opening 17 at the left hand end of the drum. This turns the shaft 11 to proper position with reference to the cam which is held with its point extending in a downward direction. The carriage, the shaft and the cam are thus secured against movement. The pneumatic hammer or staking tools 48 are operated by opening the valve at 44 and the metal of the cam is indented into the shaft at two points in the length of the shaft or where the indenting or staking heads 50 engage therewith. The cam is, in this manner, properly located and secured to the shaft with sufficient firmness that it will not disconnect therefrom during the succeeding welding operation which welds the cam to and completely around the shaft at each side thereof.

When the first cam has been thus staked the bar 39 is tilted upwardly about the pivot 40, and it will remain in upward position through the counterbalance caused by the weight 42. Handle 60 is grasped, turned downward and pulled forward until the notch 59 receives the upper end of the dog 66 whereupon the carriage is free to be changed in position. The hand wheel 36 is turned to move the carriage to the next position defined by the second notch 70. As soon as the carriage has been moved away from its first position the handle 60 may be released. In moving the handle and attached slide 58 to outer position, the end of the pin 75 is struck against and it is moved against the force of the spring 74 thereby compressing such spring. As soon as the tooth 69 at the lower end of the dog 66 comes to the next notch 70, spring 74 acts to move the bar 58 to its inner position, shown in Figs. 5 and 7, moving the dogs 66 downward against the spring 68 and elevating the block 55 and die 56. Before such elevation of the block 55 and die 56 occurs the next cam 12 has been located above the recess in die 56 so that it is engaged thereby to hold the cam against rotative movement.

The cam is thus located properly in the length of the shaft and held against rotative movement, but the shaft must be turned so as to locate the cam in proper angular relation thereto and to the other cam which has been secured in place. This is done by stepping on the foot board 32 to withdraw the rod 21, rotating the hand wheel 8 and immediately releasing the locking rod 21 after the rotation has begun and continuing the rotation until the next succeeding opening 17 in the drum 16 is entered by said rod 21. The cam is then located properly with regard to angular position on the shaft and the bar 39 with attached pneumatic staking tools is brought to its lower position, as in Fig. 5, and the operation of staking the cam on the shaft repeated.

This operation of staking the cams to the shaft is repeated for each cam thereon. There are as many notches in the bar 71 as there are cams to be secured. Likewise there are as many holes 17 in the drum 16 for reception of the rod 21 as there are cams to be secured. With this construction the cams are very quickly and easily staked in properly spaced relation in the length of the shaft and in proper angular relation around the shaft and to each other for the cams to be thereafter welded to the shaft in accordance with the Yassenoff patent previously mentioned.

The invention described has proved very practical for the purposes for which it is designed. The drum 16, in effect is an indexing element for properly turning the shaft to the position which it should have with respect to any cam held with its point downward as the cam must be made to be engaged by the die 56. The invention is defined in the appended claims and is to be considered comprehensive of all forms of structure coming within their scope.

I claim:

1. In a machine of the class described, means for holding and turning a shaft, said shaft having a cam loose thereon, means for holding the cam against movement either lengthwise of or around the shaft, means for turning the shaft to a predetermined position, releasable means for holding the shaft in such position, and means for fixing the cam on the shaft while it and the shaft are held against movement.

2. In a machine of the class described, means for holding and manually turning a shaft about its longitudinal axis, said shaft having a cam loose thereon, means for engaging the cam and holding it against rotation on the shaft and also holding it against longitudinal movement on the shaft, means for manually turning the shaft with the cam held against movement, means for automatically stopping the turning of the shaft at a predetermined position thereof and for releasably holding it in such position, and means for fixing the cam to the shaft while the shaft and said cam are both held against movement.

3. A machine of the class described comprising, a support including a bed and head and tail stock centers spaced from each other thereon, said centers being adapted to carry a shaft with a cam loose thereon, means mounted on the bed for movement lengthwise thereof adapted to releasably engage with the cam and hold the same from turning movement around the shaft, means for releasably locking said movable cam engaging means at a predetermined position on the bed to thereby locate the cam at a predetermined position in the length of said shaft, manually operable means adapted to turn the shaft, releasable means automatically stopping said shaft turning means at a predetermined selected position and thereby hold the shaft in the position to which it has been turned, and means for fixing the cam on the shaft with the cam and shaft in the positions at which they are held.

4. A construction containing the elements in combination defined in claim 3, combined with means for releasably holding said cam holding means in any of a plurality of different positions in the length of the bed whereby a cam on the shaft may be held in any of a predetermined number of positions in the length of the shaft, and means for stopping and holding said manual operable shaft rotating means in any one of a corresponding number of predetermined positions, one for each position which a cam may have on the shaft, substantially as and for the purposes described.

5. In a machine of the class described, a support comprising a bed and spaced head and tail stock centers adapted to receive a shaft therebetween, a hand wheel around the head stock center, means on the hand wheel and shaft for rotating the shaft by the wheel, said shaft being adapted to have a plurality of cams loosely placed thereon, a carriage mounted for movement lengthwise of the bed, means on said carriage to detachably engage with each of said cams on the shaft in succession and hold the same against turning movement, means for releasably locking the carriage to the bed at any one of a plurality of spaced apart positions in the length of the bed, means for locking the shaft against rotation in any one of a plurality of positions, one for each cam on the shaft, and means for securing the cams in succession to the shaft with the shaft and said cams held against movement during the securing operation.

6. In a construction of the class described, a support comprising, a bed and head and tail stocks including centers spaced from each other, said head and tail stocks being adapted to receive a shaft therebetween with a cam loose on said shaft, means mounted on the bed for releasably engaging with the cam to hold it against movement around the shaft, said means also holding the cam against movement lengthwise of the shaft, means for manually turning the shaft, means for locking the shaft against turning movement after it has been turned a predetermined distance to a selected position, and means for securing the held cam to said held shaft.

7. A construction containing the elements in combination defined in claim 6, there being a number of cams on the shaft loose thereon, means for mounting the cam holding means on said bed for movement lengthwise thereof, means for releasably locking said cam holding means in any of a plurality of different positions, one for each cam on the shaft, and means for locking the shaft against rotation in any of a plurality of different positions, one for each cam on the shaft.

8. In a construction of the class described, a support comprising, a bed and head and tail stocks including centers spaced from each other, said centers being adapted to receive a shaft therebetween, a hand wheel included in said head stock, means connecting the shaft and hand wheel for rotating the shaft by the hand wheel, a drum rotatable with said hand wheel having a continuous spiral groove therein with openings in the drum at the bottom of the groove and at different points in the length of said groove, there being a plurality of cams loose on said shaft, a carriage mounted for lengthwise movement of and on the bed, releasable means on the carriage to engage a cam and hold it against rotative movement, means for releasably locking the carriage at a plurality of different spaced points on the bed, one for each cam, and a spring actuated locking rod mounted for movement lengthwise of the drum having an end received in the groove of said drum to automatically enter any opening thereon when the drum is turned to bring an opening to the rod, substantially as and for the purposes described.

9. A construction containing the elements in combination defined in claim 8, combined with foot actuated means for withdrawing said locking rod from any opening in the drum with which it is engaged.

10. A construction containing the elements in combination defined in claim 8, combined with power operated means mounted on said carriage for staking each cam to the shaft by indenting metal of the cam into the shaft.

11. In a machine of the class described, a support including a bed, means on the bed between which a shaft having a cam loose thereon may be carried, a carriage mounted for movement lengthwise of the bed under said shaft, means for releasably locking the carriage to the bed at any one of a number of spaced points in the length of said bed, means on the carriage releasably engaging with the cam to hold it against movement around the shaft, and means for simultaneously engaging said cam engaging means with the cam and locking the carriage to the bed.

12. A construction containing the elements in combination defined in claim 11, combined with a post extending upwardly from the carriage, a bar pivotally mounted on the post, and pneumatic staking means carried on said bar and adapted to be located directly over said shaft and cam and having staking heads adapted to extend downwardly one at each side of the cam, said bar with attached pneumatic staking means being tiltable to move said staking means away from the cam and shaft.

13. In a machine of the class described, a support comprising a bed with head and tail stocks thereon for the carrying of a shaft between said head and tail stocks, said shaft being adapted to have a plurality of cams placed loosely thereon, a carriage mounted on the bed for movement lengthwise thereof, a bar on the bed underneath said carriage having a plurality of spaced apart notches therein, a dog on the carriage to engage in any notch of said bar, manually operable means on said carriage movable to two positions in one of which said dog is moved into engagement with a notch in the bar and in the other of which the dog may be released from said bar, and cam engaging means on said carriage to releasably engage with a cam and hold it against longitudinal movement on the shaft.

14. In a machine of the class described, a bed, head and tail stocks thereon between which a shaft may be mounted, said shaft being adapted to have a plurality of cams placed loosely thereon, a carriage mounted for movement to different positions in the length of the bed, a bar located lengthwise of the bed having a plurality of spaced notches therein, a dog movably mounted on the carriage to engage in any of said notches to which it is brought, spring means tending to move the dog away from the bar, a slide bar mounted on the carriage and movable to two extreme positions, said slide bar engaging with the dog to move it into a notch of the first bar in one position and in the other of said positions releasing said dog to disengage from said notch, a cam engaging block movably mounted on said carriage over said slide bar, said slide bar having an inclined upper face whereby on movement to the position in which the dog engages with a notch in the first bar, said block is elevated and to engage with a cam on the shaft to hold it against rotative movement around the shaft, and also against longitudinal movement lengthwise of the shaft by reason of the dog locking the carriage against movement.

15. A construction containing the elements in combination defined in claim 14, combined with spring impelled means against which said slide bar engages when moved to a position to release the dog and cam engaging die, and means on said slide bar engaged by the dog operating to automatically move the dog into engagement with a notch in said first bar through the action of said spring impelled means when the carriage is moved to bring the dog to any notch in said first bar.

16. Means for securing a cam loose on a shaft at a fixed position on said shaft comprising, means for rotatably mounting the shaft, releasable means for engaging the cam to hold it against rotative movement around the shaft or longitudinal movement lengthwise thereof, means for turning the shaft to a predetermined position, means for securing the cam to the shaft with the shaft and cam held against movement with respect to each other.

17. Means for securing a plurality of cams on a shaft, the cams being first placed loosely over said shaft comprising, means for supporting the shaft for turning movement, means for successively releasably engaging with each cam to hold it against rotative movement around the cam. means for successively locating each cam at a predetermined place in the length of the shaft and holding it against movement lengthwise thereof, means for turning the shaft with respect to each cam after it has been located on the shaft to a predetermined position, means for releasably holding the shaft against movement after such position is reached, and means for securing each cam in succession to the shaft while it is held against movement with respect to the shaft and the shaft held against movement with respect to the cam.

18. In a machine of the class described, means for revolubly mounting a supporting element, said supporting element having an object loose thereon, means for holding the object against movement around the supporting element, means for turning the supporting element to a predetermined position, said last mentioned means including a drum fixed to the supporting element, said drum having a helical path thereon, stop means located at predetermined points along the path and means coacting with said stop means whereby the movement of the supporting element is controlled.

19. In a machine of the class described, means for holding and turning a shaft, said shaft having a cam loose thereon, means for holding the cam against movement around the shaft, means for turning the shaft to a predetermined position, releasable means for holding the shaft in such position and means for fixing the cam on the shaft while it and the shaft are held against movement.

20. In a machine of the character described, means for holding and turning a shaft, said shaft having a cam loose thereon, means for holding the cam against movement either lengthwise of or around the shaft, means for turning the shaft to a predetermined position, and releasable means for holding the shaft in such position.

In testimony whereof I affix my signature.
GEORGE E. TUBBS.